United States Patent
Yang et al.

(10) Patent No.: US 11,947,204 B2
(45) Date of Patent: Apr. 2, 2024

(54) CHOLESTEROL LIQUID CRYSTAL DISPLAY DEVICE

(71) Applicant: IRIS OPTRONICS CO., LTD., Tainan (TW)

(72) Inventors: Wu-Chang Yang, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 17/986,882

(22) Filed: Nov. 14, 2022

(65) Prior Publication Data

US 2023/0152615 A1    May 18, 2023

(30) Foreign Application Priority Data

Nov. 17, 2021    (TW) .................................. 110142814

(51) Int. Cl.
| | | |
|---|---|---|
| G09G 3/18 | (2006.01) | |
| G02F 1/133 | (2006.01) | |
| G02F 1/1333 | (2006.01) | |
| G02F 1/1368 | (2006.01) | |
| G09G 3/34 | (2006.01) | |
| G09G 3/36 | (2006.01) | |

(52) U.S. Cl.
CPC ...... *G02F 1/13306* (2013.01); *G02F 1/13338* (2013.01); *G09G 3/3611* (2013.01); *G09G 2330/027* (2013.01); *G09G 2354/00* (2013.01)

(58) Field of Classification Search
CPC .............................................. G09G 2300/0486
See application file for complete search history.

(56) References Cited

U.S. PATENT DOCUMENTS

| | | | | |
|---|---|---|---|---|
| 2002/0186182 | A1* | 12/2002 | Stephenson .......... | G09G 3/3629 345/50 |
| 2004/0001174 | A1* | 1/2004 | Doi ....................... | G02F 1/1362 349/113 |
| 2004/0251830 | A1* | 12/2004 | Nagao .................. | G09G 3/2927 349/32 |
| 2008/0266278 | A1* | 10/2008 | Lee ...................... | G02F 1/13338 345/204 |
| 2011/0248941 | A1* | 10/2011 | Abdo .................... | G06F 3/0488 345/173 |
| 2021/0012721 | A1* | 1/2021 | Emelie ................. | G02F 1/16766 |

FOREIGN PATENT DOCUMENTS

| | | |
|---|---|---|
| CN | 1637490 A | 7/2005 |
| CN | 1754117 A | 3/2006 |
| TW | 201234332 A1 | 8/2012 |
| TW | 202142938 A | 11/2021 |

\* cited by examiner

*Primary Examiner* — Nan-Ying Yang
(74) *Attorney, Agent, or Firm* — Cheng-Ju Chiang

(57) ABSTRACT

A cholesterol liquid crystal display device includes a liquid crystal display panel and a liquid crystal driving unit. The liquid crystal display panel has a plurality of pixels. The liquid crystal driving unit applies row driving voltages and column driving voltages to a designated pixel according to the input signal. After the input signal is transmitted, the liquid crystal driving unit activates the power-down signal within a certain period of time to reduce the row driving voltage and the column driving voltage applied to the specified pixel. Thereby, the crosstalk phenomenon on the cholesteric liquid crystal display device can be improved.

11 Claims, 2 Drawing Sheets

CHOLESTEROL LIQUID CRYSTAL DISPLAY DEVICE

BACKGROUND OF THE INVENTION

1. Field of the Invention

The present invention relates to a liquid crystal display, and in particular, to a cholesteric liquid crystal display.

2. Description of Related Art

Cholesteric liquid crystal display technology is one of liquid crystal display (LCD) technologies, and cholesteric liquid crystal display has two stable states at zero electric field, which is distinct from TFT LCD and OLED display.

Based on alignment of liquid crystal molecules, cholesteric liquid crystal display can be switched between two stable states (bi-stable) such as focal conic state and planar state. Because of this characteristic, alignment of cholesteric liquid crystal molecules will be maintained without voltage (such as zero voltage). While driving voltage is applied to cholesteric liquid crystal display, alignment of cholesteric liquid crystal molecules is switched between the focal conic state and the planar state.

Crosstalk is no stranger to cholesteric liquid crystal display in prior art, and has negative impact on display quality. For example, as to handwriting mode with cholesteric liquid crystal molecules, while pixel A is applied by a driving voltage, after a period of time, pixel B is applied by another driving voltage. Driving voltages residue is accumulated at row and column lines so that crosstalk eventually occurs. Even worse, pixels that are not activated will display undesired greyscale.

Therefore, to overcome disadvantages mentioned above, the present invention provides a cholesteric liquid crystal display device.

SUMMARY OF THE INVENTION

The present invention provides a cholesteric liquid crystal display to improve crosstalk phenomenon and to avoid to prevent the unselected pixels from showing the display state. The display performance of the cholesteric liquid crystal display is guaranteed.

To achieve one or more advantages mentioned above, the present invention provides a cholesteric liquid crystal display device which includes a liquid crystal display and a liquid crystal driving unit.

The liquid crystal display panel has a plurality of pixels, and the liquid crystal driving unit is electrically coupled with the liquid crystal display panel. Based on an input signal, a row driving voltage and a column driving voltage are applied to a designated pixel. After a transmission process of the input signal is completed, a power-down signal is activated by the liquid crystal driving unit for a time period so as to reduce level of the row driving voltage and the column driving voltage which have been applied to the designated pixel previously.

According to another embodiment of the present invention, the power-down signal emitted from a zero voltage circuit is used to reset the column driving voltage and row driving voltage which are applied to the designated pixel.

According to others embodiment of the present invention, the zero voltage circuit is connected to ground electrode.

According to still others embodiment of the present invention, a start of the time period is when a transmission process of the input signals is completed.

According to another embodiment of the present invention, an end of the time period is when the next input signal is about to be transmitted.

According to some embodiment of the present invention, the time period is a time interval between two consequent input signals are transmitted.

According to some embodiment of the present invention, length of the time period is less than 2 ms (milliseconds).

According to some embodiment of the present invention, the input signals are generated by handwriting mode or keyboard input mode.

According to some embodiment of the present invention, the liquid crystal display panel is a color cholesteric liquid crystal display panel.

Therefore, the cholesteric liquid crystal display device of the present invention provides power-down signals generated from the liquid crystal driving unit to improve crosstalk phenomenon on the cholesteric liquid crystal display device and to prevent undesired pixels which are not activated from displaying undesired greyscale. Thus, image quality of the cholesteric liquid crystal display is guaranteed.

The aforementioned illustrations are exemplary for the purpose of further explaining the scope of the present invention. Other objectives and advantages related to the present invention will be illustrated in the subsequent descriptions and appended drawings.

These and other objectives of the present invention will no doubt become obvious to those of ordinary skill in the art after reading the following detailed description of the preferred embodiment that is illustrated in the various figures and drawings. Furthermore, the present invention may be embodied in various modifications, and descriptions and illustrations are not-limiting.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting.

In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

In addition, the term "comprise" and alteration, other synonyms or like should be construed to be inclusive (or open-ended) and, the term "comprise" does not exclude additional, unrecited elements, method or steps as well.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art The terminology used herein is for the purpose of describing embodiments only and is not intended to limit the full scope of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
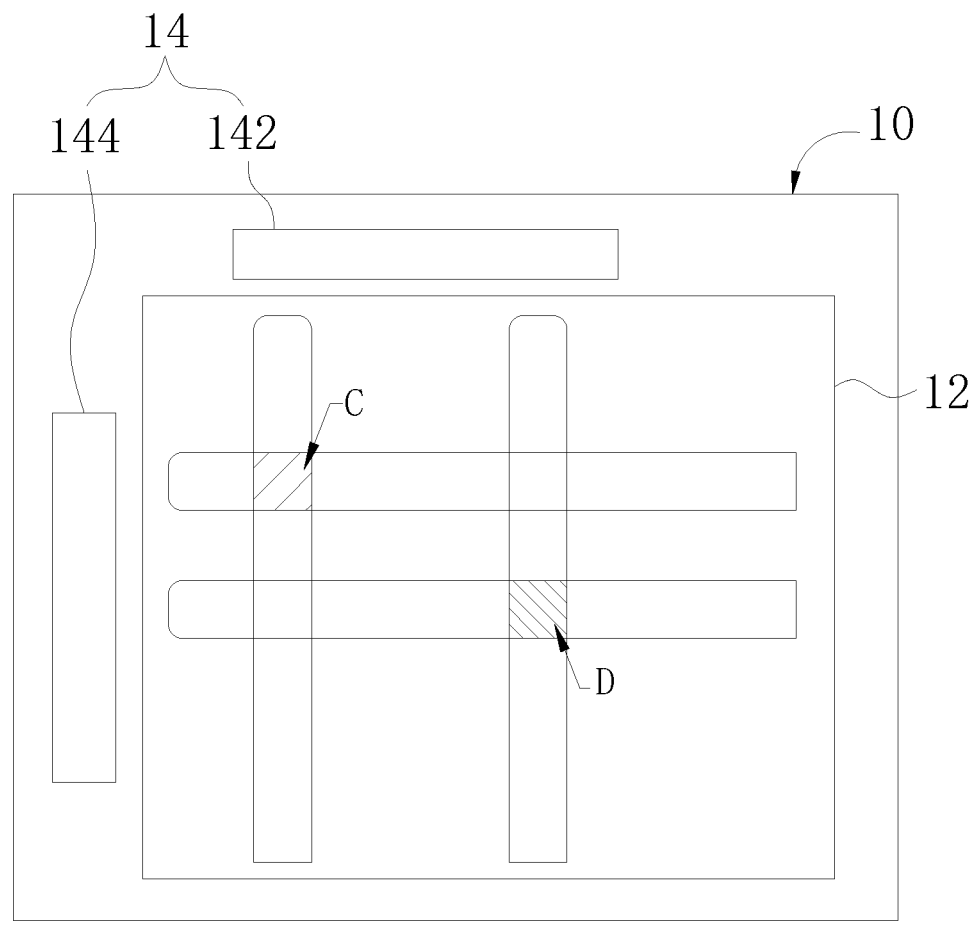
FIG. 1 shows a schematic of a cholesteric liquid crystal display device according to one embodiment of the present invention.
Figure 2:
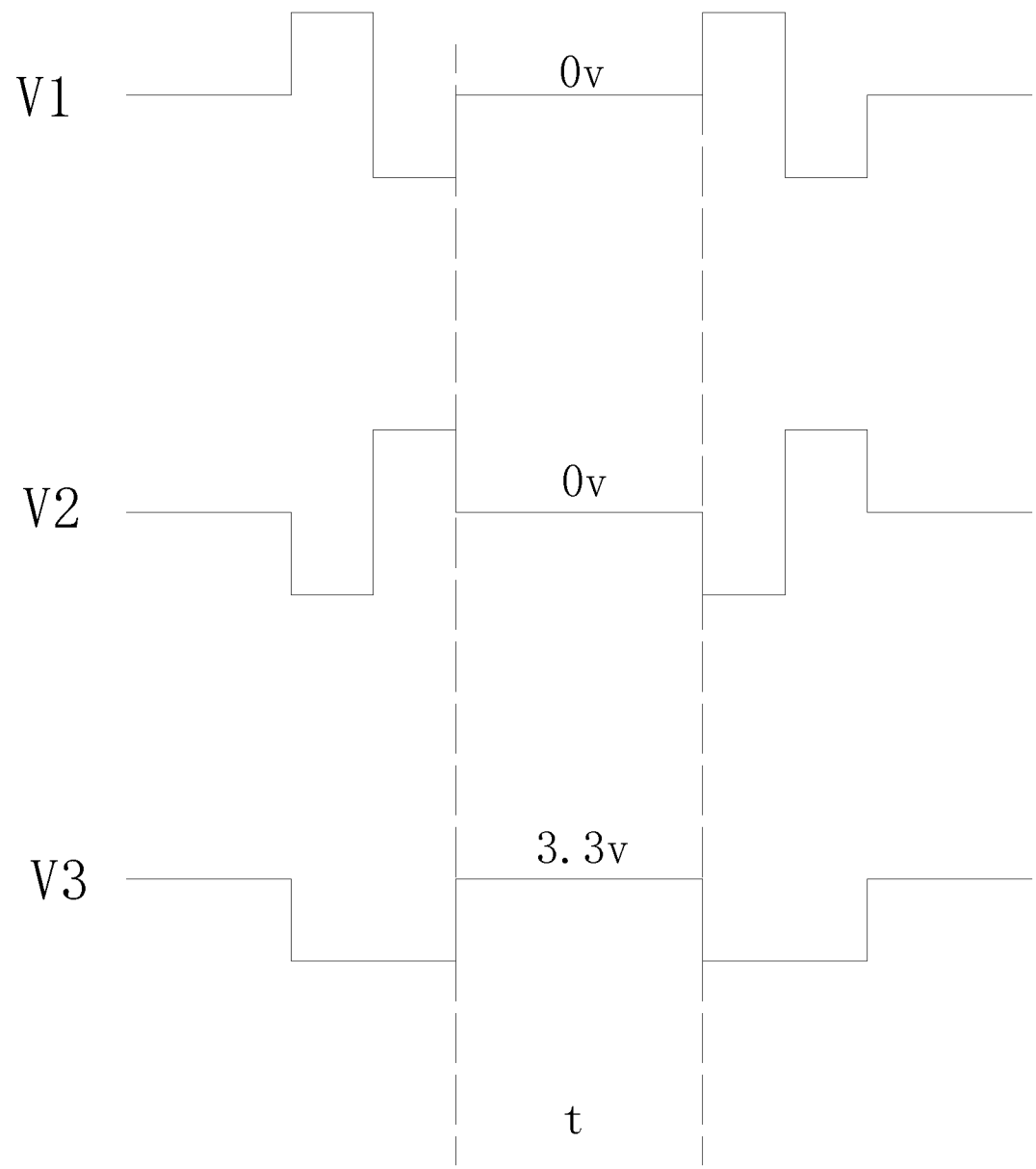
FIG. 2 shows signal waveform of row driving voltage V1, column driving voltage V2, and power-down voltage V3 which are applied to a cholesteric liquid crystal display device according to one embodiment of the present invention.

Referring to FIGS. 1 and 2, FIG. 1 shows schematic of a cholesteric liquid crystal display device 10 according to one embodiment of the present invention. FIG. 2 shows signal waveform of a row driving voltage V1, a column driving voltage V2, and a power-down voltage V3 which are applied to a cholesteric liquid crystal display device 10 of FIG. 1. To achieve advantages or at least one advantage mentioned above, the present invention provides a cholesteric liquid crystal display device 10. As shown in FIGS. 1 and 2, the cholesteric liquid crystal display device 10 includes a liquid crystal display panel 12 and a liquid crystal driving unit 14. Furthermore, the liquid crystal driving unit 14 includes a row voltage controller 142 and a column voltage controller 144.

The liquid crystal display panel 12 has a plurality of pixels. According to one embodiment, the liquid crystal display panel 12 may be a color cholesteric liquid crystal display panel.

The liquid crystal driving unit 14 is electrically coupled to the liquid crystal display panel 12, and based on input signals, a column driving voltage V2 and a row driving voltage V1 are applied to a designated pixel. After the transmission process of the input signal is completed, the liquid crystal driving unit 14 activates a power-down voltage signal in a time interval of time period t. It is used to lower level of the column driving voltage V2 and the row driving voltage V1 which are applied to the designated pixel and to clear built-up residual voltage. The row voltage controller 142 is used to generate the row driving voltage V1, and the column voltage controller 144 is used to generate the column driving voltage V2. According to embodiment of the present invention, the power-down signal corresponds to the zero voltage circuit so as to reset the column driving voltage V2 and the row driving voltage V1 which are applied to the designated pixel. Preferably, the zero voltage circuit may be reset by connecting the ground electrode.

According to an embodiment of the present invention, start of the time period t is the time when a transmission process of the input signals is completed. In an embodiment, the end of the time period t is the time when next input signal is about to be applied. In an embodiment, the time period t is within the time interval of adjacent secondary input signals. Preferably, the time period t is less than or equal to 2 ms (milliseconds). For example, if the time interval between the first input signal and the second input signal is 10 minutes, then the time period t at least can be defined in the following. 1. Start time of the time period t is an end of the first input signal, and end time of the time period t is a start of the second input signal. Time period t is 10 minutes as well. 2. Start time of the time period t is the end of the first input signal, and level of the first input signal remains unchanged for 2 ms. The time period t is close. 3. The time period t may be any arbitrary time period less than 2 ms within 10 minutes.

For instance, as shown in FIGS. 1 and 2, according to the input signals of position C, the liquid crystal driving unit 14 applies the row driving voltage V1 and the column driving voltage V2 to the designated pixel. After handwriting mode is complete (after transmission process of the input signals is completed), the liquid crystal driving unit 14 activates a power-down signal. Within the time interval of the time period t, level of a power-down voltage V3 is 3.3 voltage so that output signals of the row voltage controller 142 and the column voltage controller 144 corresponding to the designated pixel have zero voltage. The apply voltage at position C will only be generated during handwriting period so as to improve crosstalk phenomenon of the cholesteric liquid crystal display device 10.

Similarly, if input signals are applied to position D, the power-down signal is inactive while the input signals exist. The liquid crystal driving unit 14 applies the row driving voltage V1 and the column driving voltage V2 to the designated pixel (position D). After the transmission process of the input signal is completed, the liquid crystal driving unit 14 activates the power-down signal so that the row voltage controller 142 and the column voltage controller 144 are connected to the zero voltage circuit to eliminate built-up voltage.

As a whole, the power-down voltage V3 may be switched to two modes. While the power-down voltage V3 is activated, the row voltage controller 142 and the column voltage controller 144 are connected to ground electrode so that output voltage of the row driving voltage V1 and the column driving voltage V2 are zero voltage. While the power-down voltage V3 are disabled, the row driving voltage V1 and the column driving voltage V2 are normal level of voltage and applied to the designated pixel. The power-down signal may be activated in high level voltage and disabled in low level voltage, or may be activated in low level voltage and disabled in high level voltage. According to the embodiment of the present invention, as shown in FIG. 2, the power-down voltage V3 is activated in high level voltage and disabled in low level voltage. Preferably, the power-down voltage V3 is controlled by a low level voltage controller which has high level voltage of 1.8~5 voltage, and low level voltage of zero voltage. Preferably, the high level voltage is 3.3 voltage.

According to one embodiment of the present invention, the input signals correspond to handwriting input mode or keyboard input mode. The keyboard input mode uses keyboards, touch-panel keypads or virtual keyboards to enter letters, numbers etc.

To sum up, the cholesteric liquid crystal display device 10 of the present invention uses the liquid crystal driving unit 14 to generate power-down signals, so as to improve crosstalk phenomenon on the cholesteric liquid crystal display device 10 and prevent the unselected pixels from showing the display state. Thus, image quality of the cholesteric liquid crystal display is guaranteed.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesteric liquid crystal display device, comprising:
   a liquid crystal display panel, comprising a plurality of pixels; and
   a liquid crystal driving unit, electrically coupled to the liquid crystal display panel, wherein the liquid crystal driving unit applies a column driving voltage and a row driving voltage to corresponding to a previously written designated pixel (C) based on a previously written input signal, and after a transmission process of the previously written input signal is completed, the liquid crystal driving unit activates a power-down signal within a time period so as to lower voltage level of the column driving voltage and the row driving voltage for corresponding to a previously written the designated pixel (C), and the liquid crystal driving unit will apply another row driving voltage and another column driving voltage to the specified pixel (D) corresponding to the subsequent writing based on an input signal for subsequent writing, after the input signal for subsequent writing is transmitted, the liquid crystal driving unit activates the voltage reduction signal within the further period of time to reduce the row driving voltage and column driving voltage applied to the specified pixel (D) corresponding to the subsequent writing;
   wherein the power-down signal corresponds to a zero voltage circuit so that the column driving voltage and the row driving voltage for the designated pixel are connected to zero voltage.

2. The cholesteric liquid crystal display device according to claim 1, wherein the zero voltage circuit is connected to ground electrode.

3. The cholesteric liquid crystal display device according to claim 1, wherein a start of the time period is when the transmission process of the input signal is completed.

4. The cholesteric liquid crystal display device according to claim 3, wherein length of the time period is less than or equal to 2 ms (milliseconds).

5. The cholesteric liquid crystal display device according to claim 3, wherein an end of the time period is the time when next input signal is about to be applied.

6. The cholesteric liquid crystal display device according to claim 1, wherein an end of the time period is the time when next input signal is about to be applied.

7. The cholesteric liquid crystal display device according to claim 1, wherein the input signals correspond to handwriting input mode.

8. The cholesteric liquid crystal display device according to claim 1, wherein the input signals correspond to keyboard input mode.

9. The cholesteric liquid crystal display device according to claim 1, wherein the liquid crystal display panel is a color cholesteric liquid crystal display panel.

10. The cholesteric liquid crystal display device according to claim 1, wherein the time period is a time interval of adjacent secondary input signals.

11. The cholesteric liquid crystal display device according to claim 1, wherein the power-down signal improves crosstalk phenomenon on the cholesteric liquid crystal display device and prevent unselected pixels from showing a display state.

* * * * *